(12) United States Patent  
Wang et al.

(10) Patent No.: US 10,923,117 B2  
(45) Date of Patent: Feb. 16, 2021

(54) BEST PATH CHANGE RATE FOR UNSUPERVISED LANGUAGE MODEL WEIGHT SELECTION

(71) Applicant: TENCENT AMERICA LLC, Palo Alto, CA (US)

(72) Inventors: Peidong Wang, Columbus, OH (US); Jia Cui, Bellevue, WA (US); Chao Weng, Fremont, CA (US); Dong Yu, Bothell, WA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 44 days.

(21) Appl. No.: 16/279,491

(22) Filed: Feb. 19, 2019

(65) Prior Publication Data  
US 2020/0265833 A1    Aug. 20, 2020

(51) Int. Cl.  
*G06F 40/30*   (2020.01)  
*G06F 16/00*   (2019.01)  
(Continued)

(52) U.S. Cl.  
CPC .......... *G10L 15/183* (2013.01); *G10L 15/063* (2013.01); *G10L 25/03* (2013.01); *G10L 25/27* (2013.01); *G10L 2015/0635* (2013.01)

(58) Field of Classification Search  
CPC ......... G06F 40/30; G06F 16/00; G10L 15/26; G10L 15/18; G10L 19/00  
See application file for complete search history.

(56) References Cited

U.S. PATENT DOCUMENTS 5,995,928 A * 11/1999 Nguyen .................. G10L 15/18  
                                                    704/251  
8,868,409 B1 * 10/2014 Mengibar ............... G06F 40/30  
                                                    704/9

(Continued)

FOREIGN PATENT DOCUMENTS

WO    2017/184387 A1    10/2017

OTHER PUBLICATIONS

Wang et al. "Best Path Change Rate for Unsupervised Language Model Weight Selection"; Semantic Scholar, Publication [online] 2018 [retrieved Apr. 4, 2020], Retrieved from the Internet; <URL:https://pdfs.semanticscholar.org/f140/747a34ab33be6475ca668ae48dbd0ac8f700.pdf>; pp. 1-6, 6 pages total.

(Continued)

*Primary Examiner* — Shreyans A Patel  
(74) *Attorney, Agent, or Firm* — Sughrue Mion, PLLC

(57) ABSTRACT

A method for selecting an optimal language model weight (LMW) used to perform automatic speech recognition, including decoding test audio into a lattice using a language model; analyzing the lattice using a first LMW of a plurality of LMWs to determine a first plurality of best paths; analyzing the lattice using a second LMW of the plurality of LMWs to determine a second plurality of best paths; determining a first best path change rate (BCPR) corresponding to the first LMW based on a number of best path changes between the first plurality of best paths and the second plurality of best paths; and determining the first LMW to be the optimal LMW based on the first BCPR being a lowest BCPR from among a plurality of BCPRs corresponding to the plurality of LMWs.

20 Claims, 6 Drawing Sheets

(51) Int. Cl.
  G10L 15/26    (2006.01)
  G10L 15/18    (2013.01)
  G10L 15/183   (2013.01)
  G10L 25/27    (2013.01)
  G10L 15/06    (2013.01)
  G10L 25/03    (2013.01)

(56) References Cited

U.S. PATENT DOCUMENTS

| | | | | |
|---|---|---|---|---|
| 9,514,747 | B1* | 12/2016 | Bisani | G10L 15/08 |
| 9,772,994 | B2* | 9/2017 | Karov | G06F 40/211 |
| 10,573,312 | B1* | 2/2020 | Thomson | G10L 15/30 |
| 2008/0177547 | A1* | 7/2008 | Yaman | G10L 15/1815 |
| | | | | 704/257 |
| 2011/0137653 | A1* | 6/2011 | Ljolje | G10L 15/183 |
| | | | | 704/255 |
| 2012/0150539 | A1* | 6/2012 | Jeon | G10L 15/065 |
| | | | | 704/236 |
| 2015/0178285 | A1* | 6/2015 | Nagao | G06F 16/90344 |
| | | | | 707/748 |
| 2016/0104482 | A1* | 4/2016 | Aleksic | G10L 19/00 |
| | | | | 704/235 |
| 2017/0186432 | A1* | 6/2017 | Aleksic | G10L 15/26 |
| 2020/0175961 | A1* | 6/2020 | Thomson | G10L 15/063 |

OTHER PUBLICATIONS

Rúnarsdóttir, "Re-Scoring Word Lattices from Automatic Speech Recognition System Based on Manual Error Corrections", Reykjavik University; Publication [online] May 2018 [retrieved Apr. 4, 2020], Retrieved from the Internet: <URL:https.V/skemman.is/bitstream/1946/31280/1/msc_anna_vigdis_2018.pdf>; pp. 1-62, 62 pages total.

International Search Report dated May 8, 2020 in International Application No. PCT/US2020/018302.

Written Opinion dated May 8, 2020 in International Application No. PCT/US2020/018302.

* cited by examiner

BEST PATH CHANGE RATE FOR UNSUPERVISED LANGUAGE MODEL WEIGHT SELECTION

BACKGROUND

In related art speech recognition systems, an acoustic model P(A|W) and a language model P(W) are trained independently. During decoding, a likelihood score from the acoustic model and the probability from the language model are on different scales, so they need to be combined with certain scale: score(W)=log(P(A|W))+LMW*log(P(W)), where LMW is the scale value called language model weight.

In many real word applications, one trained acoustic model can be used for different recognition tasks with domain specific language models. The LMW needs to be tuned for each task.

FIG. 1 illustrates a related art LMW selection method 100 which selects LMW by performance on different development sets for different tasks. That usually requires a human transcribed development data set which is very similar to the real test data. Then the model needs to used for decoding with different LM weights. The decoding results are then compared with the true reference to obtain a word error rate (WER). Finally, the LMW with the lowest WER is selected as the optimal one.

This related art method of selecting an optimal LMW requires a development data set which is very similar to the test data. It may be hard to collect such development data which is also large enough to give reliable WER. In addition, this related art method requires WER to be calculated for every LMW.

SUMMARY

In an embodiment, there is provided a method for selecting an optimal language model weight (LMW) used to perform automatic speech recognition includes decoding test audio into a lattice using a language model; analyzing the lattice using a first LMW of a plurality of LMWs to determine a first plurality of best paths; analyzing the lattice using a second LMW of the plurality of LMWs to determine a second plurality of best paths; determining a first best path change rate (BCPR) corresponding to the first LMW based on a number of best path changes between the first plurality of best paths and the second plurality of best paths; and determining the first LMW to be the optimal LMW based on the first BCPR being a lowest BCPR from among a plurality of BCPRs corresponding to the plurality of LMWs.

In an embodiment, there is provided a device for selecting an optimal LMW used to perform automatic speech recognition includes at least one memory configured to store program code; and at least one processor configured to read the program code and operate as instructed by the program code, the program code including decoding code configured to cause the at least one processor to decode test audio into a lattice using a language model, first analyzing code configured to cause the at least one processor to analyze the lattice using a first LMW of a plurality of LMWs to determine a first plurality of best paths, second analyzing code configured to cause the at least one processor to analyze the lattice using a second LMW of the plurality of LMWs to determine a second plurality of best paths, first determining code configured to cause the at least one processor to determine a first best path change rate (BCPR) corresponding to the first LMW based on a number of best path changes between the first plurality of best paths and the second plurality of best paths, and second determining code configured to cause the at least one processor to determine the first LMW to be the optimal LMW based on the first BCPR being a lowest BCPR from among a plurality of BCPRs corresponding to the plurality of LMWs.

In an embodiment, there is provided a non-transitory computer-readable medium storing instructions, the instructions including one or more instructions that, when executed by one or more processors of a device for selecting an optimal language model weight (LMW) used to perform automatic speech recognition, cause the one or more processors to decode test audio into a lattice using a language model, analyze the lattice using a first LMW of a plurality of LMWs to determine a first plurality of best paths, analyze the lattice using a second LMW of the plurality of LMWs to determine a second plurality of best paths, determine a first best path change rate (BCPR) corresponding to the first LMW based on a number of best path changes between the first plurality of best paths and the second plurality of best paths, and determine the first LMW to be the optimal LMW based on the first BCPR being a lowest BCPR from among a plurality of BCPRs corresponding to the plurality of LMWs.

DETAILED DESCRIPTION

Language model weight (LMW) is used in speech recognition systems as a scaling factor combining acoustic and language models. The LMW for evaluation is conventionally selected to be the one yielding the best performance on a development set. This assumes that the data distributions of development and evaluation sets are similar. In practice, satisfying this assumption and keeping the development set small may not be easily achieved. Since LMW is selected for evaluation, it would be better to find the optimal LMW directly on evaluation set.

Embodiments described herein include an unsupervised LMW selection method based on best path change rate (BPCR). The basic idea is based on the observation that as the language model weight moves within a certain range, the 1-best decoding result measured by WER is usually a convex shape. Moreover, as the LMW is close to the optimal point, the best path change rate is very small. Experimental results on various corpora suggest that the BPCR based method can find the optimal LMW with high precision. The proposed method may be useful in many real world applications such as the fast adaptation of LMW to different domains.

Definitions of abbreviations and terms occurring in the detailed description include the following:

Speech Recognition System: a computer program which enables the recognition and translation of speech signals into written characters/words.

Language Model Weight (LMW): Language model weight is used in speech recognition systems as a scaling factor combining acoustic and language models.

Lattice: A lattice is a directed graph that represents variants of the recognition. A decoding lattice contains hundreds or thousands of possible decoding paths with their acoustic and language model scores.

Best Path: The path in the lattice with the largest score which is a combination of acoustic score and language model score balanced by the language model weight. The best path is usually used as the decoded hypothesis.

Word Error Rate (WER): A metric of the performance of a speech recognition system. It is the least number of operations (insertion, deletion and substitution) needed to get from the reference to the hypothesis divided by the reference length.

Figure 1:
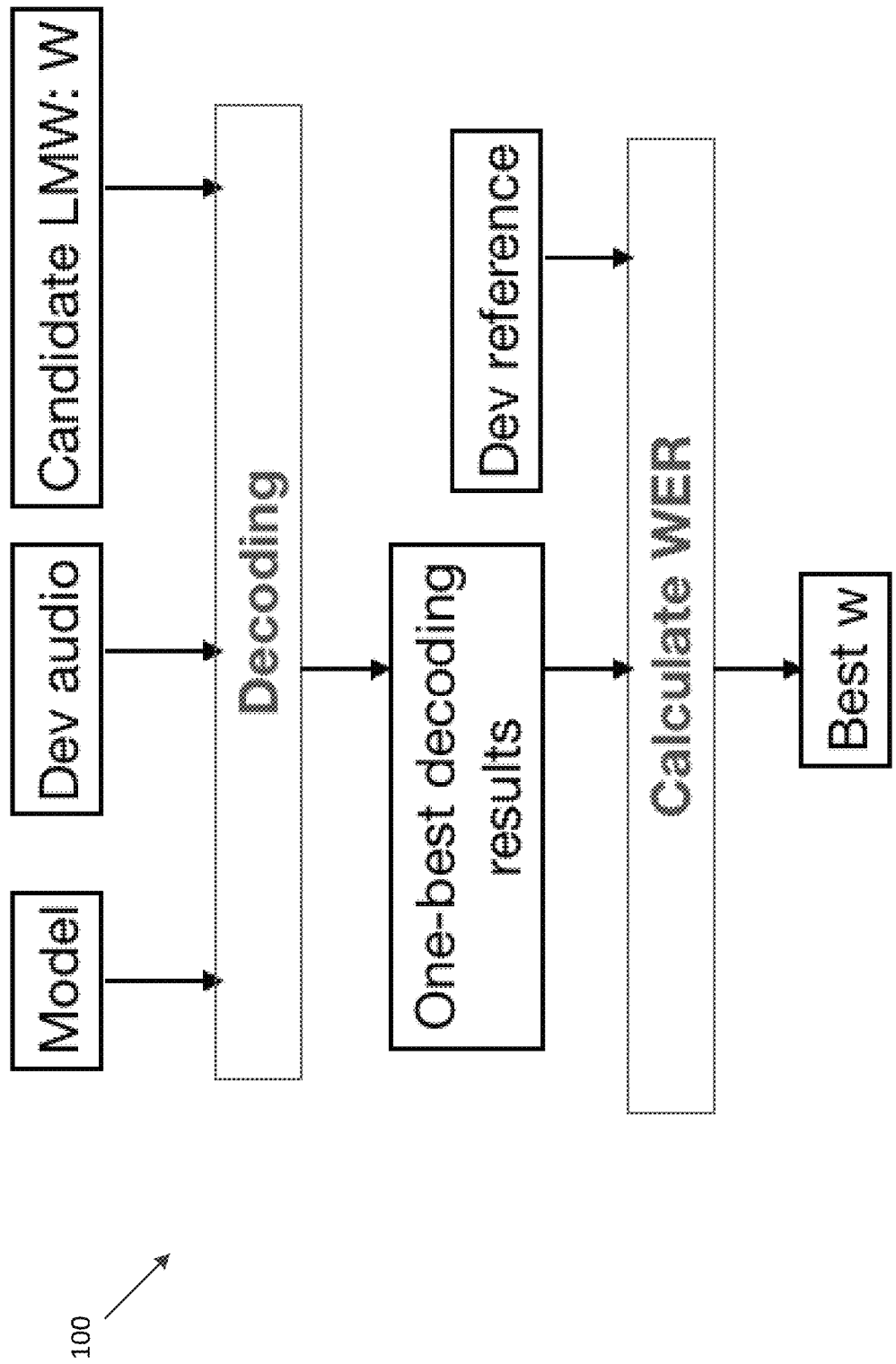
FIG. 1 is a diagram of a method for selecting a language model weight.
Figure 2:
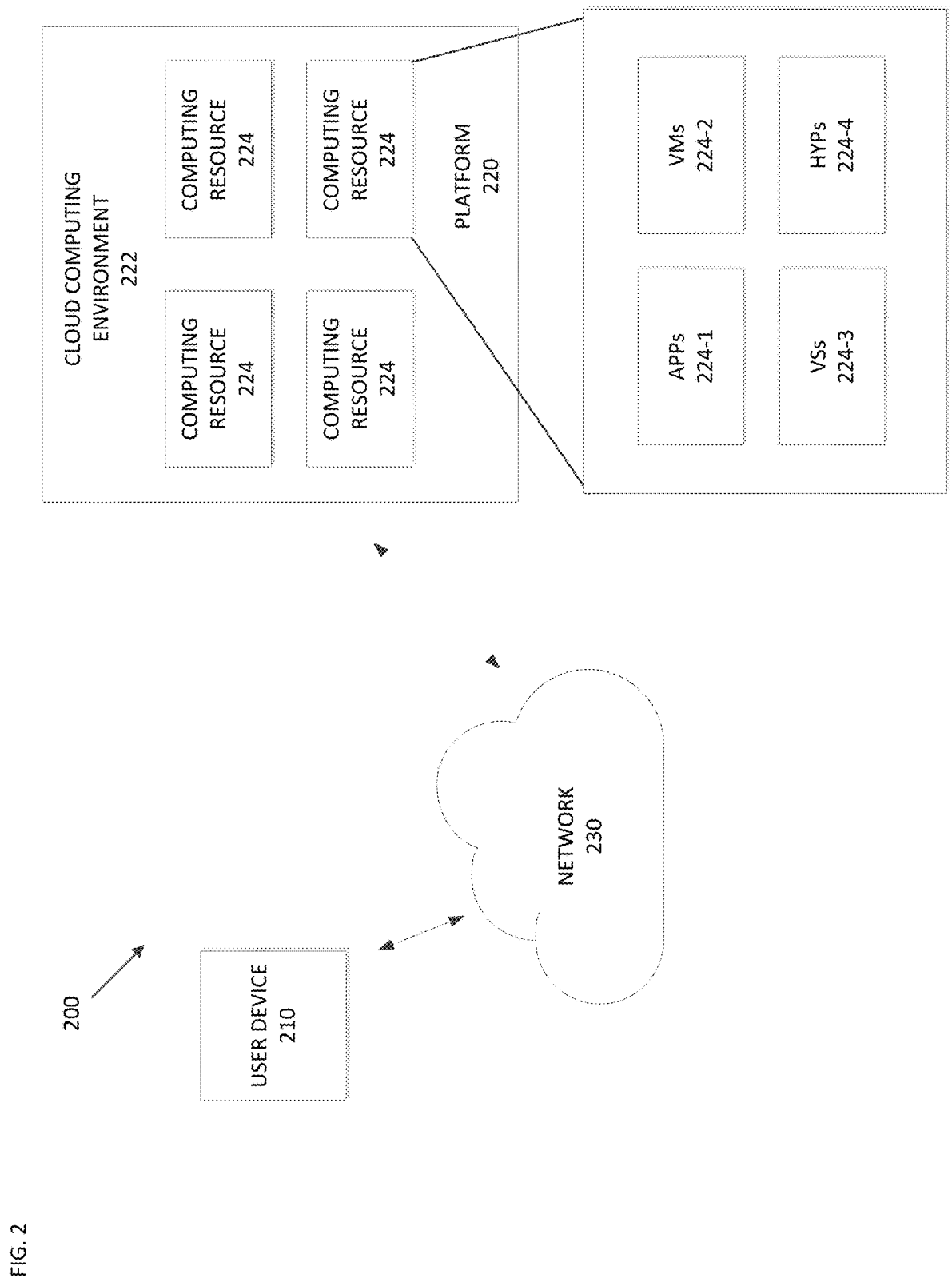
FIG. 2 is a diagram of an environment in which methods, apparatuses and systems described herein may be implemented, according to embodiments.

FIG. 2 is a diagram of an example environment 200 in which systems and/or methods, described herein, may be implemented. As shown in FIG. 2, environment 200 may include a user device 210, a platform 220, and a network 230. Devices of environment 200 may interconnect via wired connections, wireless connections, or a combination of wired and wireless connections.

User device 210 includes one or more devices capable of receiving, generating, storing, processing, and/or providing information associated with platform 220. For example, user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 210 may receive information from and/or transmit information to platform 220.

Platform 220 includes one or more devices capable of selecting an optimal LMW used to perform automatic speech recognition, as described elsewhere herein. In some implementations, platform 220 may include a cloud server or a group of cloud servers. In some implementations, platform 220 may be designed to be modular such that certain software components may be swapped in or out depending on a particular need. As such, platform 220 may be easily and/or quickly reconfigured for different uses.

In some implementations, as shown, platform 220 may be hosted in cloud computing environment 222. Notably, while implementations described herein describe platform 220 as being hosted in cloud computing environment 222, in some implementations, platform 220 is not be cloud-based (i.e., may be implemented outside of a cloud computing environment) or may be partially cloud-based.

Cloud computing environment 222 includes an environment that hosts platform 220. Cloud computing environment 222 may provide computation, software, data access, storage, etc. services that do not require end-user (e.g., user device 210) knowledge of a physical location and configuration of system(s) and/or device(s) that hosts platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210 and/or sensor device 220. Application 224-1 may eliminate a need to install and execute the software applications on user device 210. For example, application 224-1 may include software associated with platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
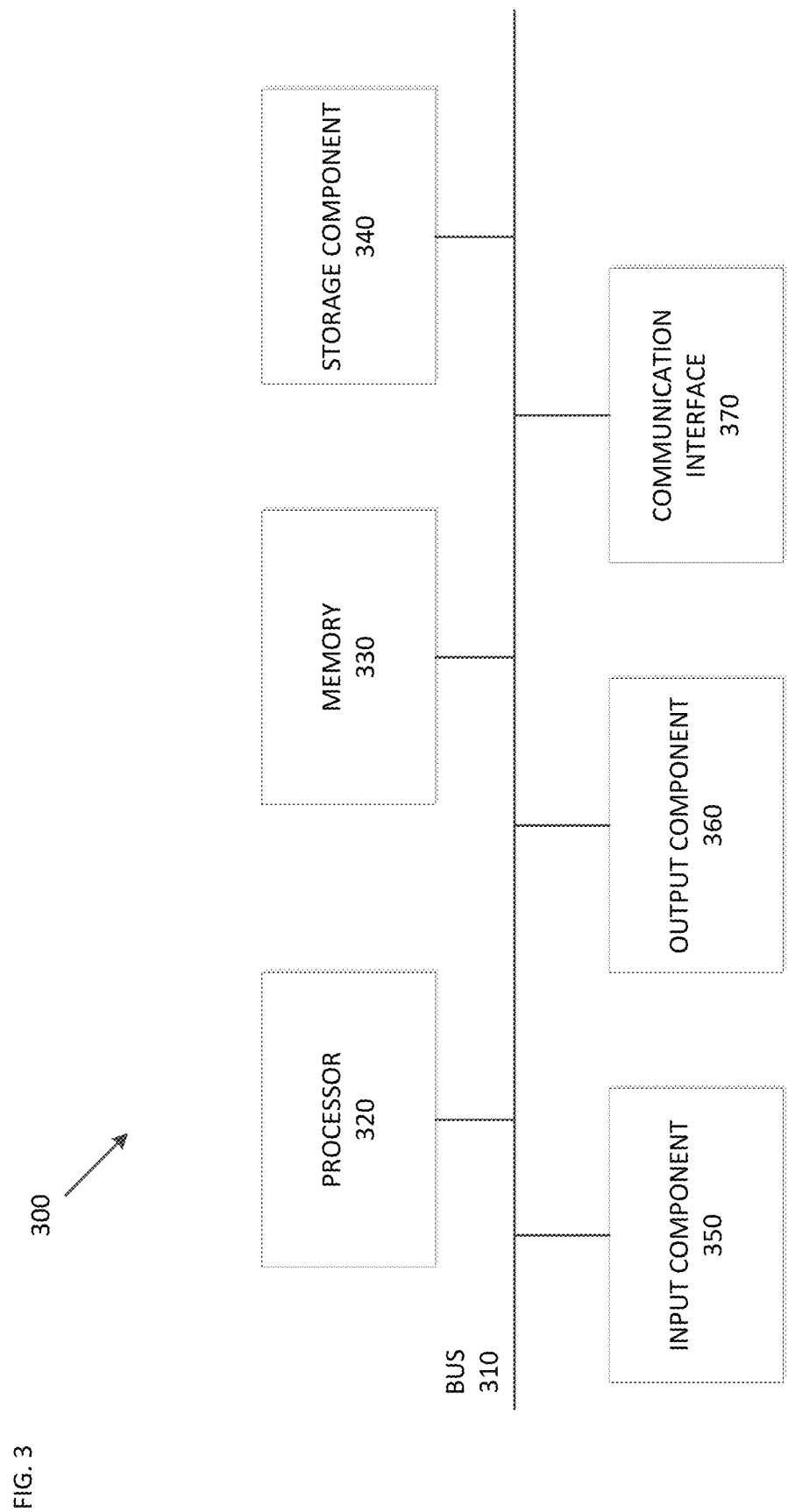
FIG. 3 is a diagram of example components of one or more devices of FIG. 2.

FIG. 3 is a diagram of example components of a device 300. Device 300 may correspond to user device 210 and/or platform 220. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
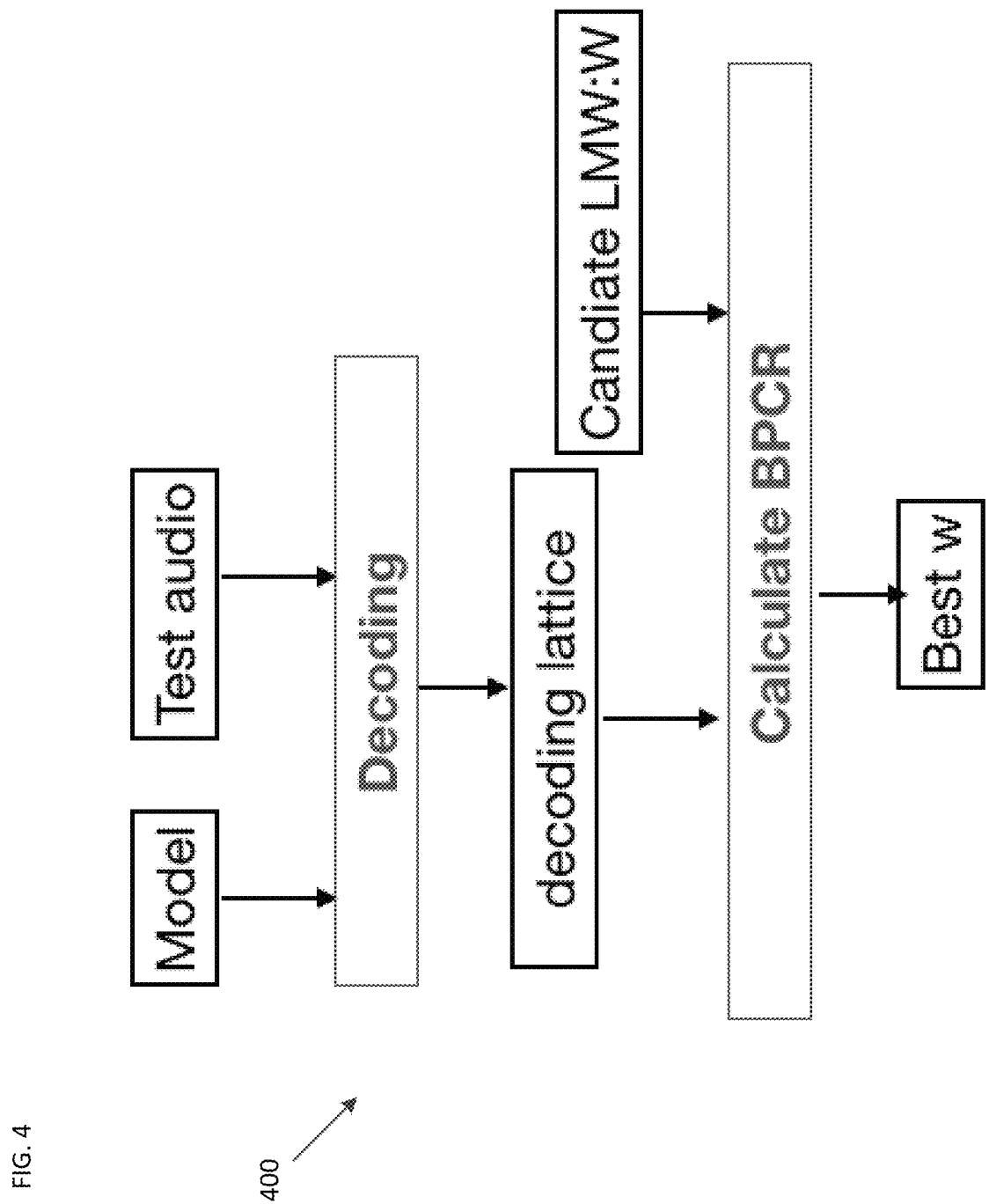
FIG. 4 is a flowchart of a method for selecting an optimal language model weight, according to embodiments.

Embodiments of the present disclosure relate to unsupervised LMW selection methods based on best path change rate (BPCR). According to embodiments, these methods select a LMW based on the statistics of the decoding results on the evaluation set without knowing the true references. FIG. 4 illustrates an example LMW selection method 400. The test audio is decoded into a lattice with a predefined scale. The BRCR calculation is requires several forward process over the lattices but no WER is calculated. Experimental results on various standard Kaldi speech recognition systems suggest that these methods may obtain LMWs comparable to or even better than related art LMW selection methods. Further, calculating the true WER numbers, embodiments of the present disclosure are capable of operating faster than related art methods in thich for every LMW, a WER is calculated.

Embodiments of the present disclosure are applicable to all conventional speech recognition tasks where the acoustic model and language model are trained independently, and their scores need to be balanced during decoding. For example, embodiments described herein may be useful when it is difficult to collect a large amount of development data similar to test data with high quality human transcriptions.

Example BPCR methods according to embodiments first decode the test audio into a decoding lattice with an initial weight. Then staring with weight w and a fixed step size ε, Viterbi decoding is performed for each time t with $w+t*\varepsilon$, $t=0 \ldots n$. For each utterance in the test audio, the best path is compared with the previous best path and a value 1 is given if the best path changes and 0 otherwise. At each time t, the total number of best path change is collected as r(w). Then the difference between neighboring r(w) is calculated. The one with the lowest |r(w)−r(w+ε)| is selected as the optimal language model weight.

Best path may refer to the output sequence with the highest posterior probability in the lattice. For each utterance, best path ps(w) may change when LMW changes. With LMW changing from w to w+ε, the number of best path changes over the whole data set can be represented as c(w) as shown in Equation 1:

$$c(w) = \sum_{s \in S} \delta(p_s(w) \neq p_s(w + \epsilon))$$ (Equation 1)

where S denotes the utterances in the whole data set and δ(·) the Kronecker delta (indicator) function. w ranges from $w_0$ to $w_n$ with step size ε. Note that we care about only whether the best path has changed regardless of how many words have changed in that path. BPCR is defined as the number of best path changes divided by the total number of utterances in the data set. In Equation 2, BPCR is denoted as r(w) and the total number of utterances as N:

$$r(w) = \frac{c(w)}{N}$$ (Equation 2)

Let R(w) be a continuous function defined by connecting r(w) values at discrete points [w, w+ε, w+2ε ... w+(n−1) ε] with linear functions. R(w) therefore defines on the continuous area [$w_0$, $w_n$]. Similarly, define Ir(w) and Dr(w). Ir(w) denotes the normalized number of best paths which increase the WER after LMW change. Dr(w) denotes those lower the WER. Note that some best path changes do not lead to WER change. These numbers are divided into half and added to Ir(w) and Dr(w) respectively so that they sum over to R(w), as shown in Equation 3:

$$R(\omega_c) = I_r(\omega_c) + D_r(\omega_c)$$ (Equation 3)

where wc is a continuous variable ranging in [w0, wn]. The intersection of curve Ir(w) and Dr(w) means when w is changed from w to w+ε, there are equal number of best paths which are changed to increase or decrease the WER.

Let E(wc) be the WER when the language model weight is wc. In many ASR systems, E(wc) is convex with one minimum point in range [w0, wn]. Since E (wc) decreases to the left of the optimal LMW and increases to the right, we assume that Ir (wc) and Dr(wc) are symmetric around wc=wopt. Without loss of generality, linear functions in Equation 4 and Equation 5 may represent Ir(wc) and Dr(wc) near wopt, respectively:

$$I_r(\omega_c)|_{\omega_c \in [\omega_{opt}-\epsilon, \omega_{opt}+\epsilon]} = -k^*\omega_c + b_I$$ (Equation 4)

$$D_r(\omega_c)|_{\omega_c \in [\omega_{opt}-\epsilon, \omega_{opt}+\epsilon]} = k^*\omega_c + b_D$$ (Equation 5)

where k (k≥0) denotes the slope of the lines. bI and bD are the intercepts for Ir(wc) and Dr(wc), respectively. According to Equation 3, R(wc) near wopt can be written as Equation 6:

$$R(\omega_c)|_{\omega_c \in [\omega_{opt}-\epsilon, \omega_{opt}+\epsilon]} = I_r(\omega_c) + D_r(\omega_c) = b_I + b_D$$ (Equation 6)

$$R'(w_{opt}) = \frac{dR(w_c)}{dw_c}\bigg|_{w_{opt}} = 0$$ (Equation 7)

Equation 6 can then be used to derive Equation 7. Note that it may not be able to find such wopt, so the LMW corresponding to the minimum value of R' (wopt) is selected for evaluation. In other words, w is selected as the optimal LMW if shifting w by ε leads to the smallest best path change rate:

$$|r'(\omega_{opt})| = |r(\omega+\epsilon) - r(\omega)|_{\omega_{opt}}$$ (Equation 8)

Figure 5:
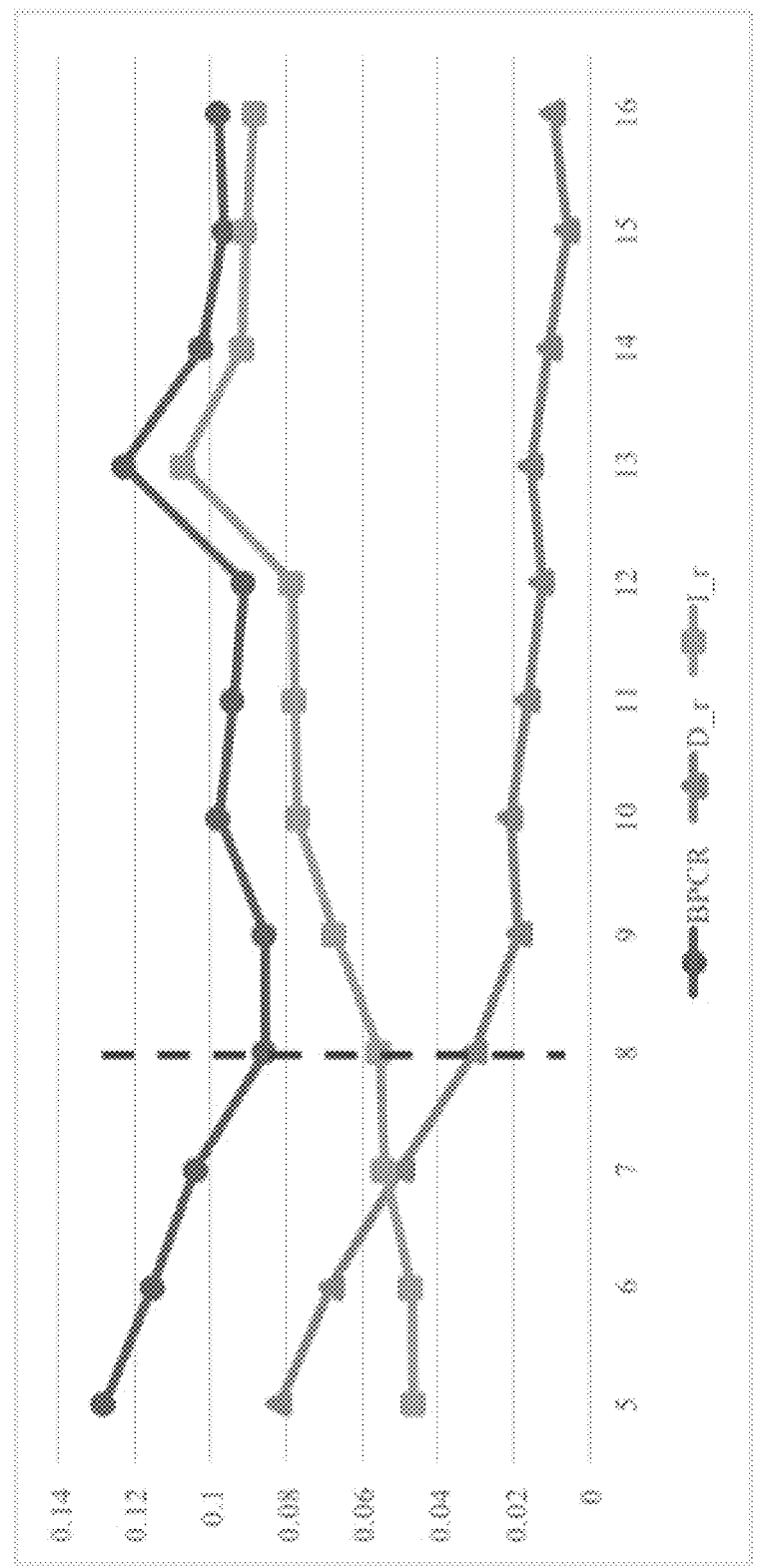
FIG. 5 is a flowchart of demonstrating changes in best path change rate, according to embodiments.

FIG. 5 gives an example of Dr(w), Ir(w) and BPCR(w) relations suppose the references are given. BPCR(w) is R(w). At the left part of x-axis which denotes the language model weight, moving w to w+ε usually improves WER with more best path changes falling into D set than into I set. After some point, the more best path changes fall into I set instead of D set. The lowest R(w) is selected which is the sum of best path changes regardless of whether they come from D or I.

Figure 6:
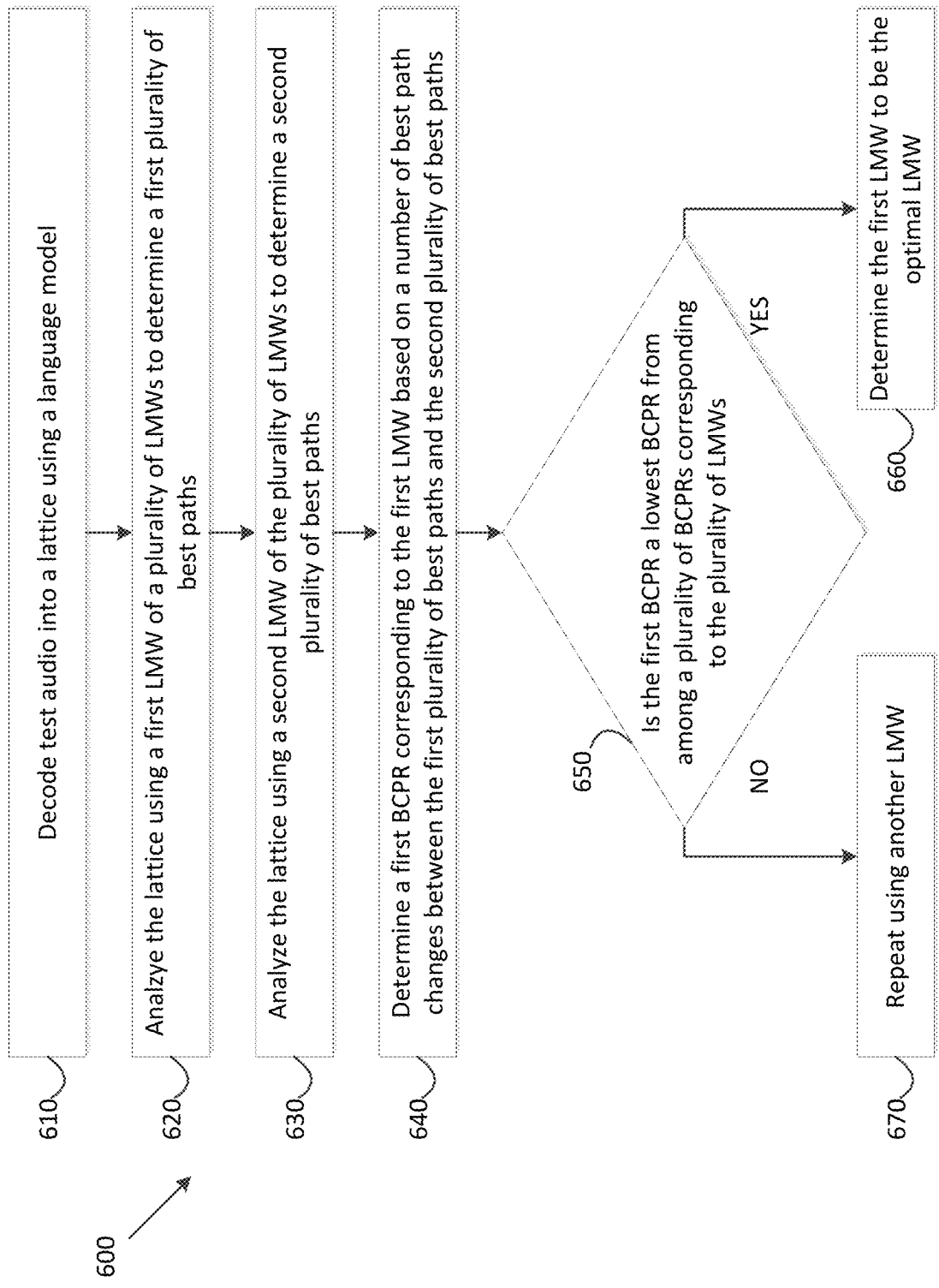
FIG. 6 is a flowchart of a method for selecting an optimal language model weight used to perform automatic speech recognition, according to embodiments.

FIG. 6 is a flowchart of a method 600 of selecting an optimal language model weight (LMW) used to perform automatic speech recognition, according to embodiments. In some implementations, one or more process blocks of FIG. 6 may be performed by platform 220. In some implementations, one or more process blocks of FIG. 6 may be performed by another device or a group of devices separate from or including platform 220, such as user device 210.

As shown in FIG. 6, in operation 610, the method 600 may include decoding test audio into a lattice using a language model.

As further shown in FIG. 6, method 600 may include analyzing the lattice using a first LMW of a plurality of LMWs to determine a first plurality of best paths at operation 620.

As further shown in FIG. 6, method 600 may include analyzing the lattice using a second LMW of the plurality of LMWs to determine a second plurality of best paths at operation 620.

As further shown in FIG. 6, method 600 may include determining a first best path change rate (BCPR) corresponding to the first LMW based on a number of best path changes between the first plurality of best paths and the second plurality of best paths at operation 620.

As further shown in FIG. 6, method 600 may include determining whether the first BCPR is a lowest BCPR from among a plurality of BCPRs corresponding to the plurality of LMWs at operation 650. If the answer at operation 650 is determined to be yes, the first LMW may be determined to be the optimal LMW at operation 660. If the answer at operation 650 is determined to be no, the at operation 670, method 600 may be repeated using another LMW of the plurality of LMWs. Operation 600 may proceed in in this manner until the optimal LMW is found.

In an embodiment, the plurality of LMWs may include a plurality of scaling factors used to combine the language model with an acoustic model.

In an embodiment, each LMW of the plurality of LMWs may be separated from neighboring LMWs of the plurality of LMWs by a fixed step size.

In an embodiment, each score of a plurality of scores corresponding to the first plurality of best paths may include a combination of an acoustic score and a language model score balanced by the first LMW, and each best path of the first plurality of best paths may include a path in the lattice with a largest score.

In an embodiment, the first LMW may be determined to be the optimal LMW based on the first BCPR being closest to a minimum value of $R'(w_{opt})$ from among the plurality of BCPRs.

Although FIG. 6 shows example blocks of the method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel.

In embodiments described above, the BPCR may be based on the path change, i.e., the value for each utterance is either 1 or 0. However, the present disclosure is not limited to this. For example, in embodiments, the number of word changes may be taken into account, comparing the edit distance between the new best path and the previous best path.

Embodiments of the present disclosure were tested on four benchmark data sets: Switchboard-1 Release 2 (SWBD), Wall Street Journal (WSJ), CHiME-4, and LibriSpeech. The SWBD corpus is a collection of two-sided telephone conversations with speakers from all areas of the United States. The WSJ corpus consists primarily of read speech from Wall Street Journal news. CHiME-4 can be viewed as a multichannel extension of WSJ for distant-talking speech recognition in noisy environments. The LibriSpeech is a relatively large corpus containing approximately 1000 hours of read English speech from audio books. On these four corpora, six acoustic models are trained using the corresponding Kaldi recipes. The language models (LMs) are built with interpolated Kneser-Ney smoothing using the SRILM toolkit.

The SWBD corpus contains about 260 hours of English telephone conversations among 543 speakers. Two deep neural network (DNN) based acoustic models are trained on MFCC features. One uses the framewise cross entropy training criterion and the other is further trained with the state-level minimum Bayes risk (sMBR) criterion. During decoding, a trigram LM trained on the 3M words of the SWBD training transcripts is applied to the two acoustic models. For the sMBR trained acoustic model, an additional experiment is conducted interpolating the SWBD trigram LM with a trigram LM trained on the 11M words of the Fisher English Part1 transcripts. The Hub5'00 set, which contains 4458 utterances, are used as the test set in our experiments.

The WSJ training set (i.e. WSJO SI-84) contains about 80 hours of recordings from 84 speakers. The acoustic model is a DNN trained with the cross entropy loss. A trigram LM with a vocabulary size of 146K is used during decoding. The Nov'92 ARPA WSJ set containing 333 utterances is used for evaluation. Experiments on the CHIME-4 corpus follow Chen et al.'s Kaldi recipe. The bidirectional LSTM based generalized eigenvalue (GEV) beamformer is applied. For acoustic modeling, a sub-sampled time delay neural network (TDNN) is trained with the lattice-free version of the maximum mutual information (LF-MMI). A 5-gram LM is used for decoding. The models are evaluated on the 330*6 real recordings of the CHiME-4 challenge. The acoustic model on the LibriSpeech corpus is trained with the sMBR criterion and decoded with the large 4-gram LM. For evaluation, the 2939 utterances in the "test-other" set is used.

With the acoustic and language models according to embodiments of the present disclosure, lattices on evaluation sets can be generated with scaling value 10. Instead of using the real best path change by comparing 1-best paths extracted from the lattice, we find in our experiments that for a given lattice, LM cost changes always correspond to best path changes. Therefore LM cost changes may be used as indicators of best path changes ps(w) in Equation 1. In embodiments, the LM cost is normalized by the length of the estimated transcription. Table 1 shows the oracle, conventional, and BPCR LMWs on various corpora and models. The cross entropy training criterion is denoted as CE.

TABLE 1

| Oracle, conventional, and BPCR LMWs | | | |
|---|---|---|---|
| corpus and model | oracle | conventional | BPCR |
| SWBD sMBR Fisher | 15 | 14 | 15 |
| SWBD sMBR trigram | 13 | 14 | 13 |
| SWBD CE trigram | 12 | 12 | 12 |
| WSJ CE trigram | 12 | 12 | 12 |
| CHiME-4 LF-MMI 5-gram | 8 | 7 | 8 |
| LibriSpeech sMBR 4-gram | 15 | 13 | 14 |

Even without the usage of development sets, BPCR according to embodiments yields comparable or better LMW estimates than related art methods. This shows the promise of BPCR as an alternative to related art LMW selection methods in tasks when the fast LMW selection and adaptation is important.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for selecting an optimal language model weight (LMW) used to perform automatic speech recognition, the method comprising:
   decoding test audio into a lattice using a language model;
   analyzing the lattice using a first LMW of a plurality of LMWs to determine a first plurality of best paths;
   analyzing the lattice using a second LMW of the plurality of LMWs to determine a second plurality of best paths;
   determining a first best path change rate (BCPR) corresponding to the first LMW based on a number of best path changes between the first plurality of best paths and the second plurality of best paths; and
   determining the first LMW to be the optimal LMW based on the first BCPR being a lowest BCPR from among a plurality of BCPRs corresponding to the plurality of LMWs.

2. The method of claim 1, wherein the plurality of LMWs comprise a plurality of scaling factors used to combine the language model with an acoustic model.

3. The method of claim 1, wherein each LMW of the plurality of LMWs is separated from neighboring LMWs of the plurality of LMWs by a fixed step size.

4. The method of claim 1, wherein each score of a plurality of scores corresponding to the first plurality of best paths comprises a combination of an acoustic score and a language model score balanced by the first LMW, and wherein each best path of the first plurality of best paths comprises a path in the lattice with a largest score.

5. The method of claim 1, wherein the number of the best path changes is represented as follows:

$$c(w) = \sum_{s \in S} \delta(p_s(w) \neq p_s(w + \epsilon)),$$

wherein c(w) denotes the number of the best path changes, s is an index of an utterance, S denotes utterances in a data set corresponding to the test audio, $\delta(\ )$ denotes a Kronecker delta function, $p_s(\ )$ denotes a best path, w denotes the first LMW, $\epsilon$ denotes a fixed step size, and w+$\epsilon$ denotes the second LMW.

6. The method of claim 5, wherein the first BCPR is represented as follows:

$$r(w) = \frac{c(w)}{N},$$

wherein r(w) denotes the first BCPR and N denotes a total number of the utterances in the data set.

7. The method of claim 6, wherein a continuous function corresponding to the BCPR is represented as follows:

$$R(\omega_c) = I_r(\omega_c) + D_r(\omega_c),$$

wherein $R(w_c)$ denotes the continuous function corresponding to the BCPR, wherein $I_r(w_c)$ denotes a normalized number of best paths which increase a word error rate after a LMW change, and $D_r(w_c)$ denotes a normalized number of best paths which decrease the word error rate after the LMW change.

8. The method of claim 7, wherein $I_r(w_c)$ and $D_r(w_c)$ are represented as follows:

$$I_r(\omega_c)|_{\omega_c \in [\omega_{opt} - \epsilon]} = -k^* \omega_c + b_I, \text{ and}$$

$$D_r(\omega_c)|_{\omega_c \in [\omega_{opt} - \epsilon, \omega_{opt} + \epsilon]} = k^* \omega_c + b_D,$$

wherein $w_{opt}$ denotes the optimal LMW, k denotes (k≥0) a slope, $b_I$ denotes an intercept for $I_r(w_c)$, and $b_D$ denotes an intercept for $D_r(w_c)$.

9. The method of claim 8, wherein $R(w_c)$ is represented as follows:

$$R(\omega_c)|_{\omega_c \in [\omega_{opt} - \epsilon, \omega_{opt} + \epsilon]} = I_r(\omega_c) + D_r(\omega_c) = b_I + b_D, \text{ and}$$

wherein $R'(w_{opt})$ is represented as follows:

$$R'(w_{opt}) = \frac{dR(w_c)}{dw_c}\bigg|_{w_{opt}} = 0.$$

10. The method of claim 9, wherein the first LMW is determined to be the optimal LMW based on the first BCPR being closest to a minimum value of $R'(w_{opt})$ from among the plurality of BCPRs.

11. A device for selecting an optimal language model weight (LMW) used to perform automatic speech recognition, the device comprising:
   at least one memory configured to store program code; and
   at least one processor configured to read the program code and operate as instructed by the program code, the program code including:
      decoding code configured to cause the at least one processor to decode test audio into a lattice using a language model,
      first analyzing code configured to cause the at least one processor to analyze the lattice using a first LMW of a plurality of LMWs to determine a first plurality of best paths,
      second analyzing code configured to cause the at least one processor to analyze the lattice using a second LMW of the plurality of LMWs to determine a second plurality of best paths,
      first determining code configured to cause the at least one processor to determine a first best path change rate (BCPR) corresponding to the first LMW based on a number of best path changes between the first plurality of best paths and the second plurality of best paths, and
      second determining code configured to cause the at least one processor to determine the first LMW to be the optimal LMW based on the first BCPR being a lowest BCPR from among a plurality of BCPRs corresponding to the plurality of LMWs.

12. The device of claim 11, wherein the plurality of LMWs comprise a plurality of scaling factors used to combine the language model with an acoustic model.

13. The device of claim 11, wherein each LMW of the plurality of LMWs is separated from neighboring LMWs of the plurality of LMWs by a fixed step size.

14. The device of claim 11, wherein the number of the best path changes is represented as follows:

$$c(w) = \sum_{s \in S} \delta(p_s(w) \neq p_s(w + \epsilon)),$$

wherein c(w) denotes the number of the best path changes, s is an index of an utterance, S denotes utterances in a data set corresponding to the test audio, δ( ) denotes a Kronecker delta function, $p_s$( ) denotes a best path, w denotes the first LMW, ε denotes a fixed step size, and w+ε denotes the second LMW.

15. The device of claim 14, wherein the first BCPR is represented as follows:

$$r(w) = \frac{c(w)}{N},$$

wherein r(w) denotes the first BCPR and N denotes a total number of the utterances in the data set.

16. The device of claim 15, wherein a continuous function corresponding to the BCPR is represented as follows:

$$R(\omega_c) = I_r(\omega_c) + D_r(\omega_c),$$

wherein $R(w_c)$ denotes the continuous function corresponding to the BCPR, wherein $I_r(w_c)$ denotes a normalized number of best paths which increase a word error rate after a LMW change, and $D_r(w_c)$ denotes a normalized number of best paths which decrease the word error rate after the LMW change.

17. The device of claim 16, wherein $I_r(w_c)$ and $D_r(w_c)$ are represented as follows:

$$I_r(\omega_c)|_{\omega_c \in [\omega_{opt}-\varepsilon, \omega_{opt}+\varepsilon]} = -k^*\omega_c + b_I, \text{ and}$$

$$D_r(\omega_c)|_{\omega_c \in [\omega_{opt}-\varepsilon, \omega_{opt}+\varepsilon]} = k^*\omega_c + b_D,$$

wherein $w_{opt}$ denotes the optimal LMW, k denotes (k≥0) a slope, $b_I$ denotes an intercept for $I_r(w_c)$, and $b_D$ denotes an intercept for $D_r(w_c)$.

18. The device of claim 17, wherein $R(w_c)$ is represented as follows:

$$R(\omega_c)|_{\omega_c \in [\omega_{opt}-\varepsilon, \omega_{opt}+\varepsilon]} = I_r(\omega_c) + D_r(\omega_c) = b_I + b_D, \text{ and}$$

wherein $R'(w_{opt})$ is represented as follows:

$$R'(w_{opt}) = \frac{dR(w_c)}{dw_c}\bigg|_{w_{opt}} = 0.$$

19. The device of claim 18, wherein the first LMW is determined to be the optimal LMW based on the first BCPR being closest to a minimum value of $R'(w_{opt})$ from among the plurality of BCPRs.

20. A non-transitory computer-readable medium storing instructions, the instructions comprising: one or more instructions that, when executed by one or more processors of a device for selecting an optimal language model weight (LMW) used to perform automatic speech recognition, cause the one or more processors to:
  decode test audio into a lattice using a language model,
  analyze the lattice using a first LMW of a plurality of LMWs to determine a first plurality of best paths,
  analyze the lattice using a second LMW of the plurality of LMWs to determine a second plurality of best paths,
  determine a first best path change rate (BCPR) corresponding to the first LMW based on a number of best path changes between the first plurality of best paths and the second plurality of best paths, and
  determine the first LMW to be the optimal LMW based on the first BCPR being a lowest BCPR from among a plurality of BCPRs corresponding to the plurality of LMWs.

* * * * *